United States Patent [19]

Tatsuguchi

[11] Patent Number: 4,769,802
[45] Date of Patent: Sep. 6, 1988

[54] INFORMATION RECORDING MEDIUM DISC AND METHOD AND APPARATUS FOR RECORDING/REPRODUCING INFORMATION USING THE DISC

[75] Inventor: Kazuo Tatsuguchi, Sagamihara, Japan

[73] Assignee: Victor Company of Japan, Ltd., Yokohama, Japan

[21] Appl. No.: 741,901

[22] Filed: Jun. 6, 1985

[30] Foreign Application Priority Data

Jun. 7, 1984 [JP] Japan ................ 59-116957

[51] Int. Cl.$^4$ ............... G11B 21/10; G11B 17/22; G11B 7/00
[52] U.S. Cl. ................... 369/46; 369/32; 369/111; 369/47; 369/275
[58] Field of Search ........... 369/13, 32, 41–46, 369/50, 111, 275, 278, 280, 47; 360/73, 72.2

[56] References Cited

U.S. PATENT DOCUMENTS

| | | | |
|---|---|---|---|
| 4,363,116 | 12/1982 | Kleuters et al. | 369/32 X |
| 4,385,303 | 5/1983 | Akahira et al. | 369/280 |
| 4,496,993 | 1/1985 | Sugiyama et al. | 369/47 |
| 4,507,763 | 3/1985 | Kato | 369/32 X |
| 4,532,561 | 7/1985 | Kimura et al. | 360/73 |
| 4,545,044 | 10/1985 | Satoh et al. | 369/58 X |
| 4,550,394 | 10/1985 | Maeda et al. | 369/44 X |
| 4,566,088 | 1/1986 | Yoshida et al. | 369/44 |
| 4,569,038 | 2/1986 | Nagashima et al. | 369/44 |
| 4,598,393 | 7/1986 | Pierce et al. | 369/46 |
| 4,618,950 | 10/1986 | Abè et al. | 369/32 |
| 4,630,252 | 12/1986 | Miura et al. | 369/44 |

FOREIGN PATENT DOCUMENTS

| | | | |
|---|---|---|---|
| 51-94842 | 8/1976 | Japan | 369/46 |
| 54-130101 | 10/1979 | Japan | 369/50 |
| 55-113139 | 1/1980 | Japan | 369/46 |
| 58-57643 | 4/1983 | Japan . | |
| 58-88838 | 5/1983 | Japan . | |

Primary Examiner—Aristotelis M. Psitos
Attorney, Agent, or Firm—Lowe, Price, LeBlanc, Becker & Shur

[57] ABSTRACT

In an optically readable information recording disc (D), a spiral guide track (T1) is formed in the form of geometrical variations to provide not only a tracking signal (Sc) but also synchronous signals (Sb, Sr) and cumulative time data (St) which varies depending on the place in the recording layer of the disc. This spiral guide track, which is referred to as ROM track, is formed when a disc is manufactured by stamping and the information uneraseably written in the guide track is read during recording and reproducing main information which is written and read out on and from another sprial track (T2) or land portion formed between two adjacent spiral guide tracks. This spiral track used for recording/reproducing main information is referred to as RAM track. The recording layer of the disc having the ROM track (T1) and RAM track (T2) is divided into a lead-in signal area (2), a lead-out signal area (4) and a main signal recording area (3) interposed between the former two areas, so that necessary lead-in signal and lead-out signal are respectively written in corresponding areas. The RAM track and two ROM tracks at both sides of the RAM track are simultaneously scanned by three laser light spots (Lb1, Lb2, Lb3) so that tracking information is read out from the two ROM tracks and synchronous signal and cumulative time data are read out from one of the two ROM tracks while main information is either written or read out on and from the RAM track.

10 Claims, 6 Drawing Sheets

FIG. 1A
FIG. 1B
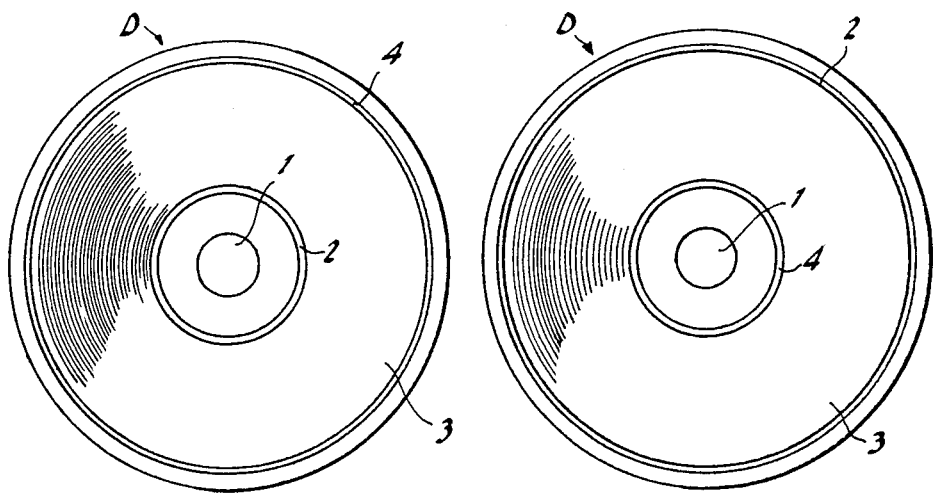
FIG. 3
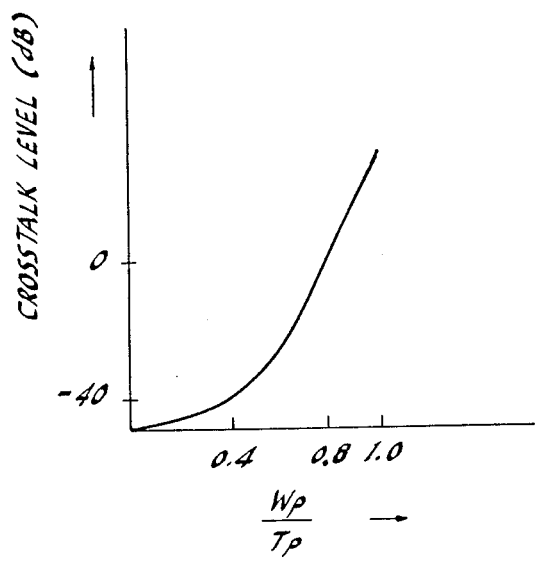

INFORMATION RECORDING MEDIUM DISC AND METHOD AND APPARATUS FOR RECORDING/REPRODUCING INFORMATION USING THE DISC

BACKGROUND OF THE INVENTION

The present invention relates generally to an information recording medium disc and method and apparatus for recording/reproducing information using optically readable disc, and more particularly to optically reading system using a disc having a recording layer from which prerecorded information can be erased so that information signals or data can repeatedly be recorded and reproduced.

Recently, as the desire of high-density recording/reproducing of information signal has become stronger and stronger in various technical fields, high-density recordings of an information signal using information recording medium of various types are proposed.

As a recording medium with which recording/reproducing of an information signal can be readily done and it is also easy to rerecord (rewrite) an information signal with recorded information signals being erased, is known a magnetic recording medium of general structure having a recording layer made of a ferromagnetic material. Recently, as a recording medium which is capable of recording, reproducing and re-recording is used an information recording disc formed by providing a recording layer of a material, such as (TeOx), which undergoes phase variation from amorphous state to crystal state or from crystal state to amorphous state by the application of electromagnetic wave, electric field or heat, or an information recording disc formed by depositing a recording layer of magnetic thin film (for instance a magnetic thin film made of a substance such as TbFe, GdTbFe, GdCo) with which thermomagnetic recording utilizing a polarity reversal caused at Curie-point temperatures or compensation temperatures of the film materials, is to be carried out, on a substrate. Such recording is advantageous in that recording density is much higher than that in conventional magnetic recording.

In order that high-density recording is satisfactorily performed, an interval (track pitch) between recording tracks has to be narrow. However, narrow track pitch makes it difficult to cause a recording transducer, a reproducing transducer, or a recording/reproducing tranducer to accurately follow the tracks on an information recording medium. To solve this problem, various attempts have been made for applying a tracking control means of various types. In the case that the recording density is further increased, the recording apparatus is required to have an extremely high precision in connection with mechanical accuracy to prevent recording tracks from overlapping each other on recording, and therefore such apparatus tends to be extremely expensive.

It was proposed as a countermeasure for resolving this problem, that a guide track is formed in advance in an information recording medium disc in an unerasable state, which guide track is used for generating a tracking reference siganl used in tracking on both or one of recording of an information signal on a recording layer of the information recording medium disc and on reproduction of the information signal from the recording layer, in the case of a disc like information recording medium arranged to perform recording/reproducing an information signal using a tiny light spot.

While constant linear velocity (CLV) recording/reproducing of an information signal has been carried out conventionally for achieving high-density recording of an information singal on an information recording medium disc, it was also proposed to record firmly (i.e. in unerasable manner) a signal like a rotation synchronization signal (or velocity signal) used for recording/reproducing at a constant linear velocity, at a portion of the above-mentioned guide track used for generating tracking reference signal.

One of the above-mentioned already prosposed information recording medium discs is disclosed in Japanese patent provisional publication 58-57643. Accoording to the proposed technique a recording layer is deposited or a substrate of an information recording medium disc in which a pilot signal for enabling the constant linear velcdity recording/reproducing has been recorded while pregrcoving is also done. Another already proposed information recording medium disc is disclosed in Japanese patent provisional publication 58-88838. According to this disc, recording is performed by making a row of pits on a recording layer by a main beam on a land portion between guide tracks used for generating the above-mentioned tracking reference signal with the guide track being scanned by a sub beam so as to perform tracking control.

In the former of the conventional already proposed information signal recording medium disc, there arises a problem that since the main information signal is recorded in the recording layer located at the pregrooved portions in which the pilot signal has been prerecorded, the pilot signal is mixed with the main information signal when the main information signal is reproduced. As a result, signal to noise ratio it deteriorated. In the latter of the conventional already proposed information signal recording medium disc, there is a risk that the signal within the guide tracks for generating tracking reference signal is mixed with the main information signal when the recording track interval (track pitch) is made small in an atempt of achieving high-density recording, and therefore improvement has been desired.

SUMMARY OF THE INVENTION

The present invention has been developed in order to remove the above-described drawbacks inherent to the conventional information recording medium discs and method and apparatus for recording/reproducing information using optically readable discs.

It is, therefore, an object of the present invention to provide new and useful information recording medium disc and method and apparatus for recording information on and from the disc.

According to a feature of the present invention a spiral guide track is formed in the form of geometrical variations in an optically readable disc to provide not only a tracking signal but also synchronous signals and cumulative time data which varies depending on the place in the recording layer of the disc. This spiral guide track, which is referred to as ROM track, is formed when a disc is manufactured by stamping and the information unerasably written in the guide track is read during recording and reproducing main information which is written and read out on and from another spiral track or land portion formed between two adjacent spiral guide tracks. This spiral track used for recording/reproducing main information is referred to as RAM track. The recording layer of the disc having the ROM track and RAM track is divided into a lead-in signal area, a lead-out signal area and a main signal recording area interposed between the former two areas, so that necessary lead-in signal and lead-out signal are respectively written in corresponding areas. The RAM track and two ROM tracks at both sides of the RAM track are simultaneously scanned by three laser light spots so that tracking information is read out from the two ROM tracks and synchronous signal and cumulative time data are read out from one of the two ROM tracks while main information is either written or read out on and from the RAM track.

In accordance with the present invention there is provided an information recording medium disc comprising a recording layer on which information can be recorded repeatedly with pre-recorded information being erased, said recording layer having a spiral guide track formed in the form of geometrical variations so as to carry at least a synchronous signal and cumulative time data indicative of the lapse of time during either recording or reproducing from a predetermined point on said recording layer, said spiral guide track functioning as a ROM track being formed such that a portion between adjacent spiral guide tracks is a flat land area which is used as a spiral RAM track for recording/reproducing information.

In accordance with the present invention there is also provided a method of recording information on an information recording disc having a recording layer in which information can be recorded repeatedly with pre-recorded information being erased, said recording layer having a spiral guide track formed in the form of geometrical variations so as to carry at least a synchronous signal and cumulative time data indicative of the lapse of time during either recording or reproducing from a predetermined point pn said recording layer, said spiral guide track functioning as a ROM track being formed such that a portion between adjacent spiral guide tracks is a flat land area which is used as a spiral RAM track for recording/reproducing information, said recording layer having a lead-in signal area, a main signal recording area, and a lead-out signal area, said cumulative time data being included in said ROM track in said lead-in signal area and said main signal recording area, said lead-out signal area including a lead-out signal indicating an end of said recording layer, said main signal recording area being interposed between said lead-in signal area and said lead-out signal area, said method comprising the steps of: reading said synchronous signal from said ROM track in said lead-in signal area by applying a light spot so as to control rotational speed of said disc thereby establishing constant linear velocity; reading a chapter number and cumulative time data from said RAM track in said lead-in signal area if such number and data are pre-recorded; shifting a record head so that a light beam therefrom is located at a place indicated by said chapter number and cumulative time data when such number and data are read out, and at a predetermined place when such number and data are not read out; and recording main information by said record head on said RAM track in said main signal recording area together with a chapter number assigned to a piece of information to be recorded and with cumulative time data read out from said ROM track adjacent to said RAM track.

In accordance with the present invention there is further provided apparatus for recording/reproducing information on an information recording disc having a recording layer in which information can be recorded repeatedly with pre-recorded information being erased, said recording layer having a spiral guide track formed in the form of geometrical variations so as to carry at least a synchronous signal and cumulative time data indicative of the lapse of time during either recording or reproducing from a predetermined point on said recording layer, said spiral guide track functioning as a ROM track being formed such that a portion between adjacent spiral guide tracks is a flat land area which is used as a spiral RAM track for recording/reproducing information, said recording layer having a lead-in signal area, a main signal recording area, and a lead-out signal area, said cumulative time data being included in said ROM track in said lead-in signal area and said main signal recording area, said lead-out signal area including a lead-out signal indicating an end of said recording layer, said main signal recording area being interposed between said lead-in signal area and said lead-out signal area, said apparatus comprising: disc drive means for rotating said information recording disc at a constant linear velocity using a synchronous signal; record/reproduce head means for applying laser light beams to said disc so that three laser light spots are directed to said recording layer of said disc for writing and reading main information on and from said RAM track using one of said three laser light spots and for reading, during writing and reading of said main information, information from two adjacent ROM tracks on both sides of said ROM track used for writing or reading using remaining two laser light spots, said record/reproduce head having a plurality of photosensitive elements responsive to light rays reflectecd at said recording layer of said disc at said three laser light spots, at least two of said photosensitive elements which are responsive to reflected light rays from said remaining two laser light spots producing tracking signals by reading the same from said two ROM tracks, while one of said two photosensitive elements producing synchronous signal and cumulative data by reading the same from one of said two said ROM tracks; shifting means for shifting said record/reproduce head to place said three laser light spots at desired positions; tracking control circuit responsive to said tracking signals from said record/reroduce head means for performing tracking control; record/reproduce circuit means for processing a recording signal to be applied to said record/reproduce head and a reproduced signal from said record/reproduce head; control means for controlling said motor dirve means, said record/reproduce head, said shifting means, said tracking control circuit, said record/reproduce circuit means so as to record and/or reproduce information on and from said disc at desired positions, said control means having a memory for storing chapter number and cumulative time data both read out from said RAM track in said lead-in signal area for controlling said shifting means when such number and data are pre-recorded.

BRIEF DESCRIPTION OF THE DRAWINGS

The object and features of the present invention will become more readily apparent from the following detailed description of the preferred embodiments taken in conjunction with the accompanying drawings in which:

FIGS. 1A and 1B are top plan views of the information recording medium disc according to the present invention;

FIG. 3 is a characteristic curve diagram showing the relatioship between crosstalk level and a factor related to track width;

The same or corresponding elements and parts are designated at like reference numerals throughout the drawings.

DETAILED DESCRIPTION OF THE INVENTION

Figure 4:
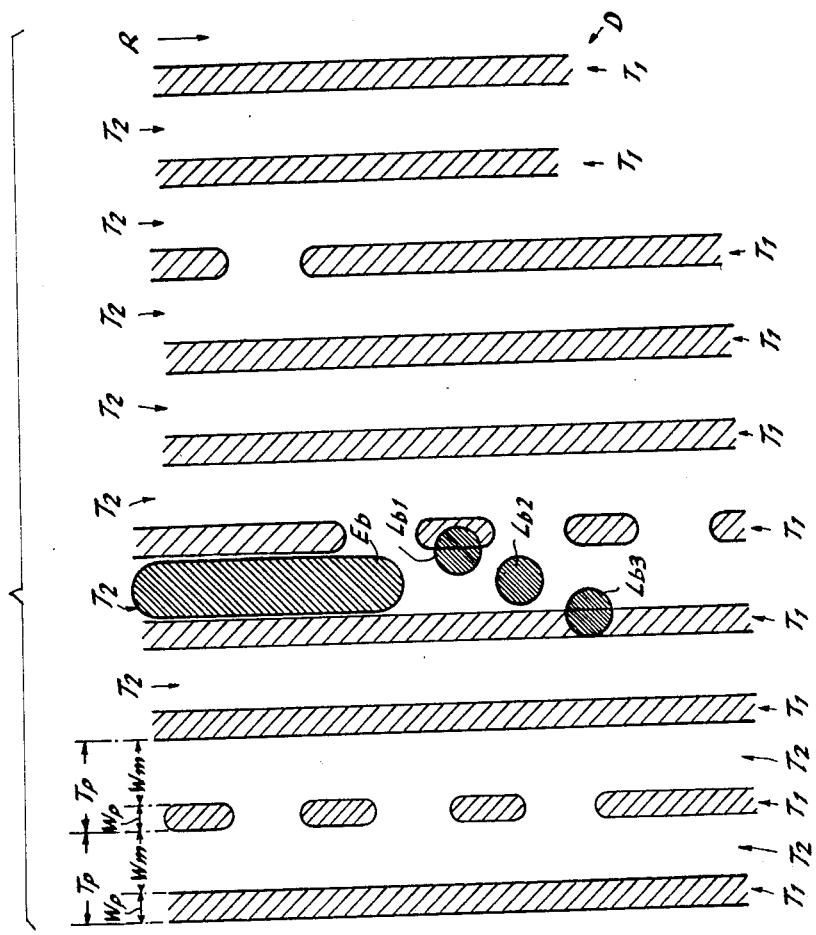
FIGS. 2 and 4 are enlarged plan views showing guide tracks provided in the form of geometrical variations and main signal recording tracks or land portion provided between two adjacent guide tracks.

FIGS. 1A and 1B are top plan views of two examples of the information recording medium disc according to the present invention. The information recording medium disc according to the present invention is an optically readable disc having a circular substrate and a recording layer deposited thereon. It is to be noted that the disc according to the present invention is of the type arranged to be used for repetitive recording with prerecorded information or data being erased. More specifically, the recording layer is made of a material such as (TeOx) in which phase variation from amorphous state to crystal state or from crystal state to amorphous state occurs, or a recording layer of a magnetic thin film (for instance, a magnetic thin film made of a substance such as TbFe, GdTbFe, GdCo) with which thermomagnetic recording, such as Curie-point temperature recording or compensation temperature recording is to be performed) with which recording, reproducing, erasing are possible so that rerecording (rewriting) can be made and high-density recording of an information signal can be performed, is provided on a substrate of the information recording medium disc in which change in geometrical shape is made spirally by tracking pilot signal in advance, and recording/reproducing of the main signal recording track performed at a constant linear velocity is under the control based on a reproduced signal obtained from the spiral recording track of tracking pilot signal, which track is provided in unerasable manner in the form of change in geometrical shape. In FIGS. 1A and 1B, the reference D generally indicates the information recording medium disc, the reference 1 indicating a lead-in signal area, the reference 3 indicating a main signal recording/reproducing area and the reference 4 indicating a lead-out signal area.

In the information recording medium disc D according to the present invention shown in FIGS. 1A and 1B, the information recording medium disc D of FIG. 1A shows an example of a structure that the lead-in signal area 2 is provided at an inner portion of the information recording medium disc D and the lead-out signal area 4 is provided at an outer portion of the information recording medium disc D, while the information recording medium disc D of FIG. 1B shows an example of a structure that the lead-in signal area 2 is provided at an outer portion of the information recording medium disc D and the lead-out signal area 4 is provided at an inner portion of the information recording medium disc D. As is apparent from these examples of FIGS. 1A and 1B, the lead-in signal area 2, the main signal recording area 3 and the lead-out signal area 4 are arranged that the main signal recording area 3 is interposed between the remaining two areas 2 and 3.

In the information recording medium disc D according to the present invention, the recording track by the pilot signal for effecting spiral tracking is provided in advance in unerasable manner in the form of geometrical variations, and this recording track is provided at all areas including the above-mentioned lead-in signal area 2, the main signal recording/reproducing area 3 and the lead-out signal area 4. More specifically, this spiral track T1 provided in the form of geometrical variations is formed when the disc D is manufactured by stamping. In detail, the spiral track or groove T1 is originally formed in a master disc by a cutting machine, which per se is well known in the art, so as to give various information to the spiral track T1, and replica discs are formed by stamping using the master disc or mother discs formed from the master disc. The above-mentioned various information carried by the spiral track or groove T1 includes synchronous signals and cumulative time data in addition to tracking information. The signal or data carried by the spiral track T1 is referred to as a pilot signal. Since the spiral track T1 is used as a fixed or read-only memory, these is referred to as a ROM track T1 hereinafter.

Portions interposed between two adjacent ROM tracks T1 are so called land portions or areas, and these land areas provided in the form of a spiral track are used for recording main information. This main information to be recorded in the land areas or spiral track T2 defined between two adjacent ROM tracks (grooves) T1 is recorded in erasable manner so that main information can repeatedly recorded and reproduced. Since this spiral track T2 corrresponding to the land portions is used as read-write memory, this is referred to as RAM track T2 hereinafter. As will be understood from the above-description, the disc D according to the present invention comprises a spiral ROM track T1 including fixed signals and data and a spiral RAM track T2 between two adjacent ROM tracks T1 including no information when the disc is fabricated so that information or data can be written and erased repeatedly.

Furthermore, according to the information recording medium disc D of the present invention in order to reduce the amount of crosstalk of the pilot signal which is crosstalked to the recording tracks of the main signal which is in the state of being sandwiched between the recording tracks of the above-mentioned pilot signal for performing spiral tracking control, to a negligibly small amount, the width Wp (see FIG. 2 or FIG. 4) of the ROM track T1 is selected to be less than or equal to 40% of the ROM track interval TP.

FIG. 3 is a diagram to be used for the description of the reason why the width Wp of the ROM track T1 in the information recording medium disc D is selected to be less than or equal to 40% of the ROM track interval TP. This diagram shows the variation of the amount or level of crosstalk of the pilot signal from the ROM track(s). to the RAM track T2 with respect to the variation of Wp/Tp which is a ratio between the width of the ROM track T1 and the ROM track pitch Tp where $Tp=Wm+Wp$ (Wm is the width of the RAM track T2 used for recording main information). As will be recognized from the graph of FIG. 3, it is made apparent from the results of experiments that the crosstalk of the tracking pilot signal to the main signal does not give undesirable influence in practical use when the value of the above-mentioned Wp/TP is less than or equal to 0.4.

Figure 2:
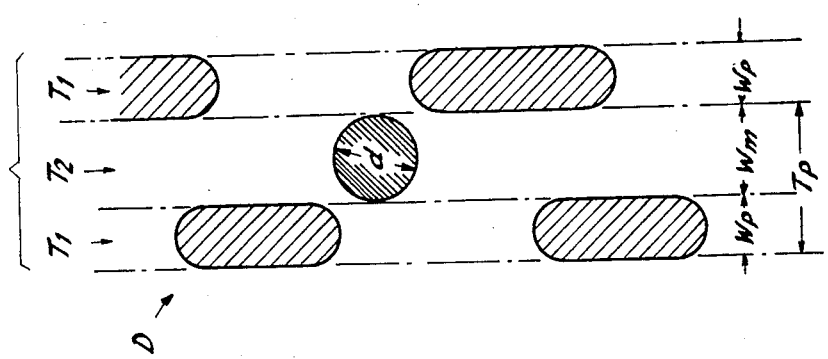

FIGS. 2 and 4 are partially enlarged views of the information recording medium disc D according to the present invention, and portions illustrated by coarse hatching are places where pits or grooves are made in the substrate in advance in unerasable manner in the form of geometrical variations, i.e. the above-mentioned ROM track T1 including the pilot signal. Portions illustrated by fine hatching are places where laser light spots are applied from record/reproduce apparatus which will be described hereinlater. Portions other than the coarse hatching portions in FIGS. 2 and 4 are land portions, and land portions interposed between any two consecutive ROM tracks T1 form the RAM track T2.

Figure 5A:
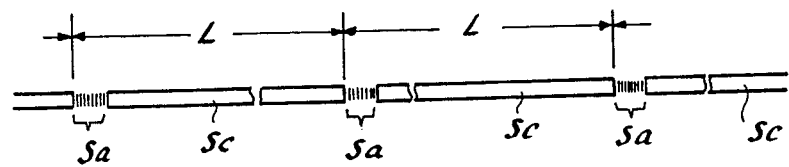
FIGS. 5A, 5B, and 6 are diagrams showing the structure of a tracking pilot signal recorded in the guide tracks, at the time of fabrication of the disc, in the form of geometrical variations to be unerasable during recording and/or reproducing.
Figure 5B:
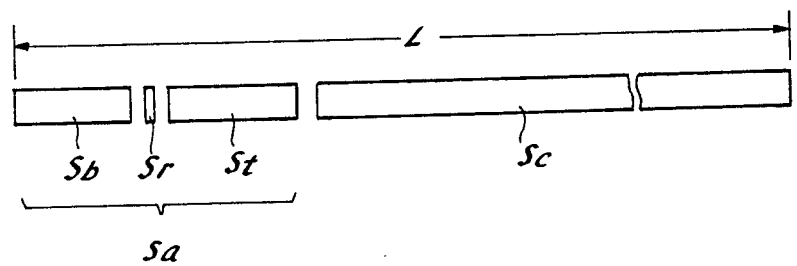

FIGS. 5A and 5B are schematic diagrams for describing the signal form of the pilot signal included in the ROM track T1. FIG. 5A shows that the pilot signal comprises a sequence of block signals each of which includes a unit formed by specific signals, while FIG. 5B shows a detailed example of the unit block signal of the tracking pilot signal.

While in the information recording medium disc D according to the present invention, the ROM track T1 is provided all the areas of the information recording medium disc D as described in the above, i.e. all the areas including the lead-in signal area 2, the main signal recording/reproducing area 3 and the lead-out signal area 4, this does not mean that the ROM track T1 is made such that the tracking pilot signal has the same structure throughout all the areas.

More particularly, in the information recording medium disc D according to the present invention, the signal recorded or written in advance in the ROM track T1 includes a tracking information signal provided as substantially continuous grooves throughout all the areas, a rotation syncronization signal provided at a given interval throughout all the areas, data of cumulative time value provided to both the lead-in signal area 2 and the main signal recording/reproducing area 3 other than the lead-out signal area 4, and a lead-out signal (go-home signal) provided to only the lead-out signal area 4. Since the cumulative time value represents the lapse of time during either recording or reproducing from a predetemrined point of the disc D as will be described in detail hereinafter, the data thereof changes one from another. Therefore, the pilot signal recorded in the ROM track T1 provided throughout all the areas on the information recording medium disc D does not have the same signal form throughout all the areas.

In FIG. 5B showing a unit block signal used for constituting the pilot signal, an exmaple is shown such that the unit block signal comprises a synchronous bit Sb, a rotation synchronous signal Sr, cumulative time data Sd, and a continuous signal portion Sc. The unit block signal always comprises two signal portions, i.e. the continuous signal portion Sc and a signal portion Sa other than the same {in the example of the signal shown in FIG. 5B, the signal portion Sa comprises the synchronous bit Sb, the rotation synchronous signal Sb, and the cumulative time value data St} irrespective of the constitution of the unit block signal, and the length L of a single unit block including the above-mentioned two signal portions Sa and Sc is always constant at any portion in the information recording medium disc D.

Figure 6:
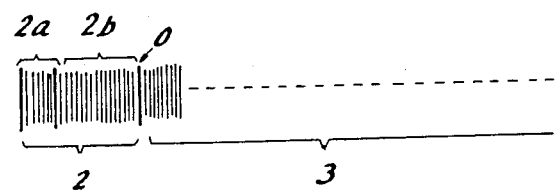

In the two signal portions Sa and Sc forming the unit block signal, the synchronous bit Sb in the signal portion Sa has a structure that a synchronous code is represented by a predetermined plurality of bits, while the rotation synchronous signal Sr is an impulse having a given pulse width for instance, and the cumulative time value data St is a numerical value signal, regarding the boundary between the lead-in signal area 2 and the main signal recording/reproducing area 3 as a reference time position where cumulative time is zero, representing a positive cumulative time value with respect to the main signal recording/reproducing area 3 beyond the above-mentioned reference time position, and also representing a negative cumulative time value with respect to the lead-in signal area 2 beyond the above-mentioned reference time position (the contents of the signal recorded in the lead-in signal area 2 will be described hereinlater in detail with reference to FIG. 6).

The above-mentioned synchronous bit Sb, the rotation synchronous signal Sr, the cumulative time value data St, or the like are recorded on the surface of the information recording medium disc D as pits corresponding to the above-mentioned signals, whereas the continuous signal portion Sc in the two signal portions Sa and Sc forming the unit block signal is recorded as a continuous elongate groove on the surface of the substrate of the information recording medium disc D.

The substrate, in which the ROM track T1 is formed in advance, of the disc D is coated with a recording layer to be completed as an optical information recording/reproducing disc. As a material of the recording layer may be used TeOx which undergoes phase variation from amorphous state to crystal state or from crystal state to amorphous state by the application of electromagnetic wave, electric field or heat. Alternatively, a magnetic thin film made of a substance such as TbFe, GdTbFe, GdCo, with which thermomagnetic recording, such as Curie-point temperature recording or compensation temperature recording, is to be carried out, may be used as the recording layer coating the surface of the substrate of the information recording medium disc D.

The ROM track T1 shown in FIG. 2 is a portion formed by pits by the above-mentioned signal portion Sa, while in FIG. 4, a portion of a recording track by the pilot signal formed by both the pits by the signal portion Sa and the elongate groove by the continuous signal portion Sc is shown.

FIG. 6 is a diagram schematically showing tracks (ROM tracks T1 and RAM tracks T2) in the lead-in signal area 2 and in the main signal recording/reproducing area 3 of the disc D so that the tracks within a given angle with respect to the center of the disc D are shown. In FIG. 6, the references 2a and 2b are used to distiguish two areas in the lead-in signal area 2, and the reference 0 being used to indicate the boundary between the lead-in signal area 2 and the main signal recording/reproducing area 3. In FIG. 6, thin vertical lines indicate the direction of the ROM tracks T1 as well as the RAM tracks T2.

In FIG. 6, the pilot signals respectively recorded in the ROM track T1 in the area 2a of the lead-in signal area 2 and in the ROM track T2 in the area 2b of the lead-in signal area 2 have different signal forms from each other. More, specifically, while each block of the pilot signal comprises the signal portion Sa and the elongate groove signal portion Sc as described in the above, the signal portion Sa of the pilot signal recorded in the area 2a of the lead-in signal area 2 comprises only the rotation synchronous signal Sr, whereas the signal portion Sa of the pilot signal recorded in the area 2b of the lead-in signal area 2 comprises the synchronous bit Sb, the rotation synchronous signal Sr and the cumulative timve value data St. A position of the boundary between the above-mentioned area 2a and the area 2b is used as a starting place for rewriting lead-in information.

As is apparent from the above description, in the information recording medium disc D according to the present invention, since rotation synchronous signal is recorded in the ROM track T1 in advance in unerasable manner, recording/reproducing operation with high recording density can be effected according to CLV system satisfactorily using the rotation synchronous signal. In addition, it is possible that recording time and linear velocity are not affected by a used recording-/reprducing apparatus because the rotational speed of the disc D is controlled using synchronous signals read out from the ROM track T2 which is arranged to be continuously scanned all the time during recording and reproducing as will be described in detail hereinlater. More over, since the lead-in signal area 2 and the lead-out signal are 4 are provided so as to record lead-in signal or information and lead-out signal or information respectively therein to give record/reproduce apparatus address information with which a record/reproduce head thereof is moved to scan a desired position, the interchangeability with so called compact disc is obtained. Furthermore, lead-out information is arranged to be written only at the end of a newest recording position and lead-in information in the lead-in signal area is rewritten each time new main information is recorded to indicate its associated champter number an cumulative time value. As a result misaccessing is effectively prevented. Moreover, since data of both positive and negative cumulative time values with respect to reference time position are used, recording time can be accurately indicated by time data inherent to the position where recording is done. This cumulative time data functions as absolute addresses of information or data recorded or to be recorded in the RAM track T2, and thus quick access is made possible. Furthermore, since the RAM track T2 used for recording/reproducing main information signal is different from the ROM track T1 carrying the pilot signal, there is an advantage that S/N of the main signal is improved.

Now for a better understanding of various features of the information recording medium disc D according to the present invention, recording/reproducing operation using the information recording medium disc D will be described with reference to the recording track pattern shown in FIG. 4 and the block diagram of the recording/reproducing apparatus shown in FIG. 7.

Figure 7:
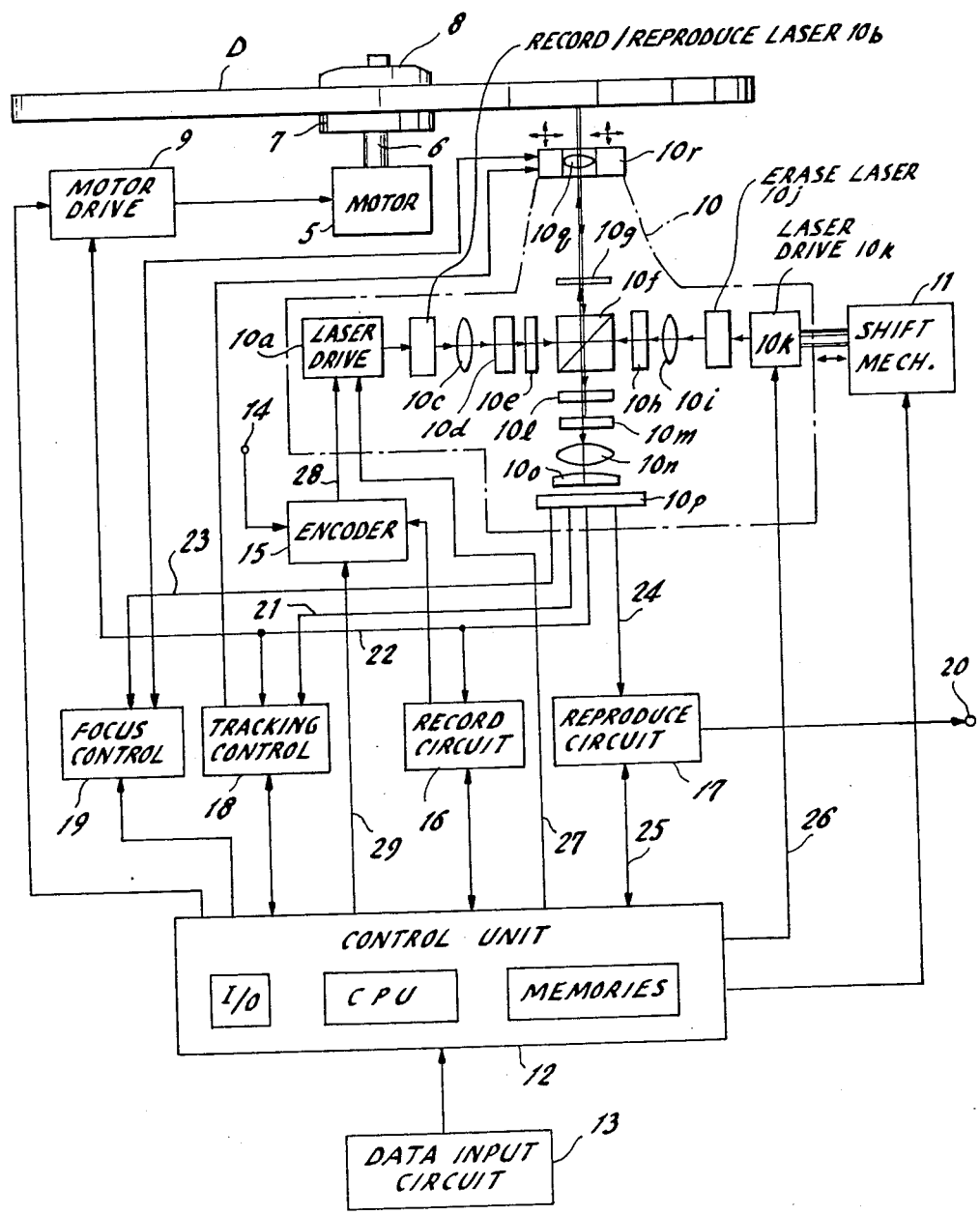
FIG. 7 is a block diagram of the recording/reproducing apparatus according to the present invention, which is apparatus is used with the disc.

In FIG. 7, the reference 5 is a motor for driving and rotating the information recording medium disc D, the refernece 6 being a shaft of the motor, the reference 7 being a turntable, the reference 8 being a clamper used for securing the information recording medium disc D on the turntable 7 so that the disc D is driven by the motor 5 which is driven and rotated by driving electric power supplied from a motor driving control circuit 9. As a result, the information recording medium disc D is rotated under a condition in which its recording (reproducing) surface has a relative velocity with respect to a light spot by a recording (reproducing) laser beam assumes a predetermined linear velocity all the time.

The above-mentioned motor driving control circuit 9 generates driving power which is supplied to the motor 5 so that the information recording medium disc D is driven and rotated at a rotational speed where an error signal obtained by a comparison between the rotation synchronous signal Sr read from the ROM track T1 of the information recording medium disc D and a reference signal, equals zero.

An optical record/reproduce head 10 is arranged to be shifted in a radial direction of the information recording medium disc D by way of a shifting mechanism 11. The shifting mechanism 11 is arranged to shift the optical record/reproduce head 10 in radial direction of the disc D and at a shifting speed both determined by a control signal from a control unit 12 in accordance with an operating mode set in a data input circuit 13. The control unit 12 includes a microcomputer having a central processing unit CPU, memories, and an input/output device, and supplies the above-mentioned motor driving control circuit 9, and other structural parts in addition to the above-mentioned shifting mechanism 11 with control signals which are necessary for respective operating modes set in the data input circuit 13. This data input circuit 13 comprises manually operable switches or keys such as ten-keys for manually inputting desired chapter number of information to be played back for instance.

The above-mentioned optical record/reproduce head 10 comprises a recording/reproducing laser driving circuit 10a, recording/reproducing laser 10b, collimating lenses 10c and 10i, laser beam cross-sectional shape correcting elements 10d and 10h, a diffraction grating 10e, a polarizing prism 10f, quarter wave plates 10g and 10l, an erasing laser 10j, an erasing laser driving circuit 10k, a dichroic mirror 10m, a condenser lens 10n, a cylindrical lens 10o, a light-receiving portion 10p including a plurality of light-receiving or photosensitive elements, an objective lens 10q, an actuator 10r and so on.

Figure 8:
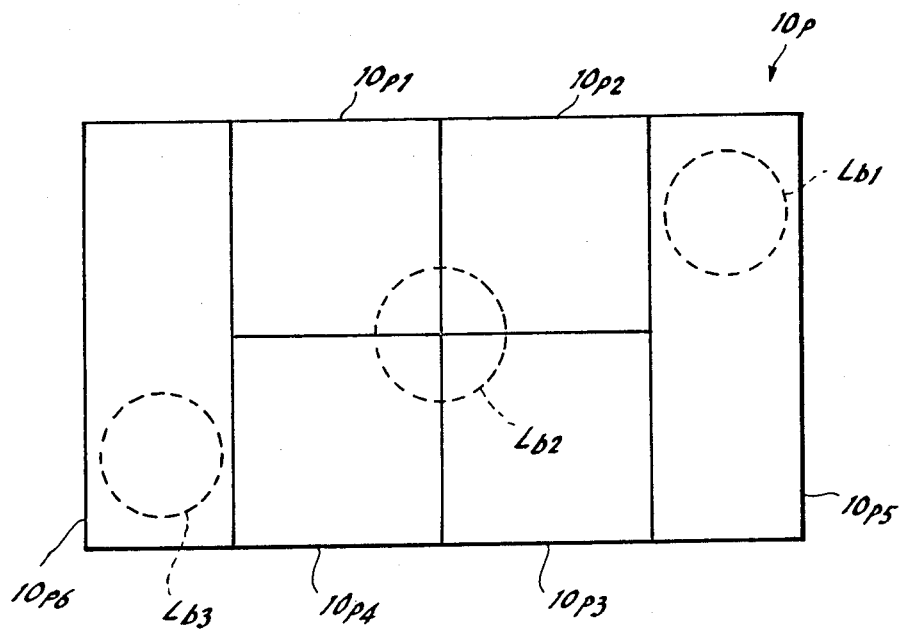
FIG. 8 is a schematic diagram showing a light-receiving portion including a plurality of photosensitive elements to be responsive to three light beams reflected at the disc.

FIG. 8 shows a top plan view of the light-receiving portion 10p having six photosentive elements arranged as illustrated. In detail, four photosensitive elements 10p1 to 10p4 are arranged in quadrant fashion and remaining two photosensitive elements 10p5 and 10p6 are positioned at opposite ends of the four photosensitive elements 10p1 to 104. The four photosensitive elements 10p1 to 10p4 arranged at the center are used to be responsive to one of three light beams reflected at the surface of the disc D, while the two photosensitive elmements 10p5 and 106 are used to be responsive to remaining two light beams reflected at the same. In other words, a light beam corresponding to the laser light spot Lb2 of FIG. 4 is arranged to be incident on the four photosensitive elements 10p1 to 10p4 for deriving main information from the RAM track T2 as well as focus error signal, and two other light beams corresponding to the laser light spots Lb1 and Lb3 are arranged to be incident on the two photosensitive elements 10p5 and 10p6 so that tracking information is derived from two ROM tracks T1 at both sides of the RAM track T1. In addition, the synchronous information as well as cumulative time data are derived from one of these two photosensitive elements 10p5 and 10p6.

The reference 14 is an input terminal for information signal which is an objective of recording, the reference 15 being an encoder, the reference 16 being a record circuit, the reference 17 being a reproduce circuit, the reference 18 being tracking control circuit, the reference 19 being a focus control circuit, and the reference 20 being an output terminal of a reproduced signal.

When the recording/reproducing apparatus is in record mode, the above-mentioned recording/reproducing laser 10b of the optical record/reproduce head 10 and the erasing laser 10j, arranged to emit laser light of a wavelength different from that of the laser light emitted from the recording/reproducing laser 10b, are both put in light-emitting condition. On the other hand, when the recording/reproducing apparatus is in reproduce mode, only the recording/reproducing laser 10b of the optical record/reproduce head 10 is put in light-emitting condition, while the erasing laser 10j is disabled. Light emission power of the recording/reproducing laser 10b in reproducing mode is controlled to be smaller than that of the same in record mode.

When the recording/reproducing apparatus is in record mode, laser light emitted from the erasing laser 10j erases prerecorded information in the RAM track T2 of the information recording medium disc D prior to recording of information signal by a spot of recording laser light of a small diameter whose cross-section is circular as shown at the reference Lb2 in FIG. 4, by applying a spot of erasing laser light whose cross-section is elongate in a direction of the extension of the RAM track T2, as shown at the reference Eb in FIG. 4, on a recording layer of the information recording medium disc D on the way that the laser light from the erasing laser 10j passes along a passage of the erasing laser 10j —the collimating lens 10i —the laser beam cross-sectional shape correcting element 10l —the polarizing prism 10f —the quarter wave plate 10l —the dichroic mirror 10m —the quarter wave plate 10l —the polarizing prism 10f —the quarter wave plate 10g —the objective lens 10q —the information recording medium disc D—the objective lens 10q —the quarter wave plate 10g —the polarizing prism 10f —the diffraction grating 10e —the laser beam cross-sectional shape correcting element 10d —the collimating lens 10c (In FIG. 7, for the purpose of simple illustration, a passage of erasing laser light reflected at the information recording medium disc D is omitted. In the case that a magnetic material is used as the material of the recording layer of the information recording medium disc D so as to perform thermomagnetic recording, the cross-sectional shape of the spot of the erasing laser light may be circular.).

When the recording/reproducing apparatus is put in record mode in accordance with an operating mode set in the input portion 13, prior erasing of the prerecorded portions in the information recording medium disc D is satisfactorily performed with the erasing laser 10j being put in light-emitting state as described in the above by a control signal fed from the control unit 12 via a line 26 to the erasing laser driving circuit 10k of the optical record/reproduce head 10. Simultaneously, the power of light emitted from the recording/reproducing laser 10b is controlled to have an intensity necessary on recording by a control signal fed from the control unit 12 via a line 27 to the recording/reproducing laser driving circuit 10a of the optical record/reproduce head 10.

Furthermore, a signal from an encoder 15 is supplied via a line 28 to the recording/reproducing laser driving circuit 10a so that the laser light emitted from the recording/reproducing laser 10b is intensity modulated by the signal fed from the encoder 15 to the recording/reproducing laser driving circuit 10a.

When the recording/reproducing apparatus is put in record mode in accordance with an operating mode set in the input portion 13, the laser light emitted from the recording/reproducing laser 10b is applied via a passage of the recording/reproducing laser 10b —the collimating lens 10c —the laser beam cross-sectional shape correcting element 10d —the diffraction grating 10e to the diffraction grating 10e so that three laser beams are generated at the diffraction grating 10e, which laser beams include a diffraction light laser beam of 0th order (a laser beam causing a recording light spot shown at Lb2 in FIG. 4 on the information recording medium disc D) and diffracted light laser beams of ± first order (laser beams causing tracking light spots indicated at Lb1 and Lb3 in FIG. 4 . . . this light spot Lb1 on the information recording medium disc D will be used for reading the pilot signal as will be described hereinlater).

The three laser beams emitted from the diffraction grating 10e as described in the above propagate via a passage of the polarizing prism 10f —the quarter wave plate 10g —the objective lens 10q to make three light spots Lb1, Lb2 and Lb3 as shown in FIG. 4 on the recording surface of the information recording medium disc D rotating in a direction of an arrow R in FIG. 4. As a result, recording of an information signal on the RAM track T2 is performed by the recording laser light spot having a small diameter and a circular cross-section as indicated by the reference Lb2 in FIG. 4, while two laser light spots having small diameter and circular cross-section indicated at the rerences Lb1 and Lb3 in FIG. 4 are arranged to be located at boundaries between the ROM track T1 and its adjacent RAM track T2 so as to be used for generating a tracking reference signal. In addition, one of the above-mentioned two laser light spots Lb1 and Lb3 having a small diameter, that is the laser spot light Lb1, which precedes the laser light spot Lb2 used for recording, is also used for reading out the information signal (various signals forming the signal portion Sa described with reference to FIG. 5) recorded in the ROM track T1 carrying the pilot signal.

Reflected light from the three laser light spots Lb1 to Lb3 made on the information recording medium disc D by the three laser beams incident on the information recording medium disc D as described in the above, is applied via a passage of the objective lens 10q —the quarter wave plate 10g —the polarizing prism 10f —the quarter wave plate 10l —the dichroic mirror 10m —the condenser lens 10n —the cylindrical lens 10o to the light-receiving portion comprising a plurality of light-receiving elements.

In the light-receiving portion 10p, a tracking error signal obtained on the basis of an output signal from a light-receiving element converting the reflected light from the laser light spots Lb1 and Lb3 into electrical signals respectively, is fed via a line 32 to a tracking control circuit 18, while information signals (various signals forming the signal portion Sa described with reference to FIG. 5) obtained from a signal which is obtained by converting reflected light from the laser light spot Lb1 into an electrical signal, is fed via a line 22 to a record circuit 16, the tracking control circuit 18 and the motor driving control circuit 19. Furthermore, a focus error signal obtained from a signal which is obtained by converting light reflected from the laser light spot Lb2 into an electrical signal by a plurality of light-receiving elements, is fed via a line 23 to the focus control circuit 19.

A reproduced signal generated by the light-receiving portion 10p from a signal obtained by photoelectric conversion of the reflected light of the laser light spot Lb2 irradiating the RAM track T2, is outputted via a line 24 to a reproduce circuit. A signal sent to the above-mentioned line 24 as the reproduced signal when the recording/reproducing apparatus is in record mode, is based on reflected light of the recording laser light spot which light is intensity modulated by an information signal which is an objective of recording, and therefore this is not a reproduced signal in its original sense. This reproduced signal fed from the light-receiving portion 10p via the line 24 to the reproduce circuit 17 in record mode, is outputted via the output terminal 20 for monitoring the recording laser modulator, the reproduce-demodulator circuit and so on as a so called light-EE system signal. At this time, since the light intensity on recording is several to ten times the intensity on normal reproducing, the amplification degree of the record circuit 17 is controlled to be suitable therefor by a control signal fed from the control unit 12 in record mode.

Subsequently, when the recording/reproducing apparatus is put in reproduce mode in accordance with an operating mode set in the input portion 13, the erasing laser 10j is caused to interrupt light emission by a control signal fed from the control unit 12 via the line 26 to the erasing laser driving circuit 10 of the optical record/reproduce head. Simultaneously, the power of light emission of the recording/reproducing laser 10b is reduced to a constant small intensity necessary on reproduction, by the control signal fed from the control unit 12 via the line 27 to the recording/reproducing laser driving circuit 10a of the optical record/reproduce head 10. Furthemore, in the reproduce mode, the output signal from the encoder 15 is prevented from being supplied to the recording/reproducing laser driving circuit 10a by a control signal fed from the control unit via the line 29 to the encoder 15.

The laser light emitted from the recording/reproducing laser 10b in reproduce mode propagates via a passage of the recording/reproducing laser 10b —the collimating lens 10c —the laser beam cross-sectional shape correcting element 10d —the diffraction grating 10e to the diffraction grating 10e in the same manner as the operation of the recording/reproducing apparatus in the above-described record mode, so that three laser beams are generated at the diffraction grating 10e, which laser beams include a diffraction light laser beam of 0th order (a laser beam causing a recording light spot shown at Lb2 in FIG. 4. on the information recording medium disc D) and diffracted light laser beams of ±first order (laser beams causing tracking light spots indicated at Lb1 and Lb3 in FIG. 4).

The three laser beams emitted from the diffraction grating 10e as described in the above propagate via a passage of the polarizing prism 10f —the quarter wave plate 10g —the objective lens 10q to make three light spots Lb1, Lb2 and Lb3 as shown in FIG. 4 on the recording surface of the information recording medium disc D rotating in a direction of an arrow R in FIG. 4. As a result, reproducing of an information signal from the RAM track T2 is performed with the reproducing laser light spot having a small diameter and a circular cross-section as indicated by the reference Lb2 in FIG. 4 being continuously irradiated on the RAM track T2 of the information recording medium disc D, while two laser light spots having small diameter and circular cross-section indicated at the rerences Lb1 and Lb3 in FIG. 4 are arranged to be located at boundaries between the RAM track T2 and the ROM track T1 so as to be used for generating tracking reference signal.

Reflected light from the three laser light spots Lb1 to Lb3 generated at the information recording medium disc D by the three laser beams incident on the information recording medium disc D, propagate via a passage of the objective lens 10q—the quarter wave plate 10g—the polarizing prism 10f—the quarter wave plate 10l—the dichroic mirror 10m—the condenser lens 10n—the cylindrical lens 10o to the light-receiving portion 10p including a plurality of light-receiving elements.

In the light-receiving portion 10p, a tracking error signal obtained on the basis of an output signal from a light-receiving element converting the reflected light from the laser light spots Lbl and Lb3 into electrical signals respectively, is fed via a line 32 to a tracking control circuit 18, while a focus error signal obtained from a signal obtained by photoelectrically converting reflected light from the laser light spot Lb2 into an electrical signal, is fed via a line 23 to a focus control circuit 19. In addition, a reproduced signal generated by the light-receiving portion 10p from the signal obtained by photoelectrically converting, by the plurality of light-receiving elements, the reflected light of the laser light spot Lb2 irradiating the RAM track T2 is outputted via a line 24 to the reproduce circuit 17 in which given signal processing such as decoding is performed to output a reproduce signal to an output terminal 20.

The contents of the recording/reproducing apparatus will be further described in detail by illuminating the ways of ulilization of signals of various signal areas such as the lead-in signal area 2, the main signal recording/reproducing area 3, the lead-out signal area 4 and so on of the information recording medium disc D on recording of an information signal on the information recording medium disc D and on reproducing of the information signal from the information recording medium disc D.

When input information for putting the recording/reproducing appartus in record mode is applied to the input portion 13, the control unit 12 generates control signals with which operations necessary in record mode are performed in sequence, and these control signals are supplied to respecive portions of the recording/reproducing apparatus to cause the same to perform recording.

When the recording/reproducing apparatus is put in record mode, since the shifting mechanism 11 moves the optical record/reproduce head 10, with the control signal generated by the control unit 12 being supplied via the line 30 to the shifting mechanism 11, from its home position to a position where the laser light spots Eb, Lbl to Lb3 are positioned within an area 2a of the lead-in signal area 2 in the information recording medium disc D and subsequently to cause the laser light spots Eb, Lbl to Lb3 to be shifted from an area 2b of the lead-in signal area 2 of the information recording medium disc D to the main signal recording/reproducing area 3 in sequence.

In a period where the laser light spots Eb, Lb1 to Lb3 are positioned within the lead-in signal area 2 of the information recording medium disc D after record mode is started, the recording/reproducing apparatus is temporarily put in reproduce state so that a lead-in signal including chapter number, cumulative time value data and so on, which are recorded in the area 2a of the lead-in signal area 2, is read out to be stored in a memory of the control unit 12 via the reproduce circuit 17. The control unit 12 supplies the shifting mechanism 11 with the control signal with which the optical record/reproduce head 10 is quickly shifted so that the laser light spots Eb, Lbl to Lb3 are positioned at a recording-starting portion following a prerecorded portion in the main signal recording/reproducing area 3 using the read out cumulative time value data.

Putting the recording/reproducing apparatus in record mode, in a state where the laser light spots Eb, Lbl to Lb3 are positioned within the area 2a of the lead-in signal area in the information recording medium disc D with optical record/reproduce head 10 being shifted from its home position, the pilot signal read out from the ROM track Tl formed in the the above-mentioned area 2a of the information recording medium disc D comprises two signals portions, as described in above, i.e. the signal portion Sa and the continuous signal portion Sc. Since the pilot signal recorded in the ROM track Tl, which track exists in the area 2a of the lead-in signal area 2 of the information recording medium disc D, has a signal form such that its signal portion Sa comprises only the rotation synchronous signal Sr, under a condition where the laser light spots Eb, Lbl to Lb3 are positioned within the area 2a of the lead-in signal area 2 of the information recording medium disc D, the rotation synchronous signal Sr is read out from the ROM track Tl carrying the pilot signal by way of the laser light spt Lbl (lead-in signal can be searched quickly if a signal to be recorded in the ROM track Tl carrying the pilot signal in the area 2a of the lead-in signal area 2, is arranged such that the signal portion Sa comprises the rotation synchronous signal Sr and the lead-in signal).

As the recording/reproducing apparatus is put in record mode, the motor driving control circuit 9, to which the control signal is fed from the control unit 12 via the line 31, controls the rotation of the motor 5 so that that motor 5 rotates at a predetermined rotational speed of an initial value. Then the recording/reproducing apparatus is put in a state where the laser light spots Lbl to Lb3 are positioned within the area 2a of the lead-in signal area 2 of the information recording medium disc D to read out the rotation synchronous signal Sr by the laser light spot Lbl, and this rotation synchrnous signal Sr is fed from the light-receiving portion 10p to the motor driving control circuit 9 to be compared with a reference signal. As a result, the motor driving control circuit 9 controls the rotational speed of the motor 5 so that the period of the rotation synchronous signal Sr, which is read out the the laser light spot Lbl, is constant all the time, thereby the relative velocity between the laser light spots and the information recording medium disc D assumes a predetermined constant speed all the time.

As the optical record/reproduce head 10 is shifted by the shifting mechanism 11 so that the position of the laser light spots is shifted to the area 2b beyond the boundary between the area 2a and the area 2b of the lead-in signal area 2 of the information recording medium disc D, the pilot signal read out from the ROM track Tl in the area 2b is arranged such that its signal portion Sa comprises the rotation synchronous signal Sr and the negative cumulative time value data St, and the rotation synchronous signal Sr is fed to the motor driving control circuit 9 to be used to control the rotational speed of the motor 5, while the negative cumulative time value data St is used in the control unit 12 for the generation of the control signals.

Furthermore, since a chapter number corresponding to recording contents recorded at the end of former cycle recording operation, cumulative time value data corresponding to the recording area or the like are recorded in all the RAM tracks T2 in the area 2b of the lead-in signal area 2, when the optical reacord/reproduce head 10 is shifted by the shifting mechanism 11 so that the position of the laser light spots moves in the area 2b of the lead-in signal area 2 of the information recording medium disc D, a lead-in signal including the chapter number corresponding to recording contents recorded at the end of former cycle recording operation, cumulative time value data corresponding to the recording area or the like is read out from the RAM track T2 in the area 2b, and this read out signal is fed via the reproduce circuit 17 to the control unit 12 to be stored in a memory.

The control unit 12 is arranged to cause the shifting mechanism 11 to shift the optical record/reproduce head 10 so that the laser light spots are positioned at a position in the main signal recording/reproducing area 3 of the information recording medium disc D from where signal recording of present cycle recording is to be started, using the cumulative time value data corresponding to the recording area of the former cycle recording operation. After the optical record/reproduce head 10 has been shifted, then the optical record/reproduce head 10 is put in stand-by state at the place (At the end portion of the former cycle recording, the cumulative time value data is recorded over several tracks as will be described hereinlater, and then a lead-out signal is recorded thereafter. The above-mentioned stand-by position is the place where the cumulative time value data is recorded over several tracks.).

In the case of recording on the information recording medium disc D having no prerecorded information, since no lead-in signal is read out from the area 2b of the lead-in signal area 2, the optical record/reproduce head 10 is put in stand-by state so that the laser light spots are positioned at a place where the cumulative time value data exhibits a given value, for instance a place where the cumulative time value data is of $-2$ seconds.

After the instant of beginning of recording by the recording/reproducing apparatus, the erasing laser (semiconductor laser) 10j is put in light-emitting state by the control signal fed from the control unit 12 via the line 26 to the erasing laser driving ciruit 10k of the optical record/reproduce head 10, while recording/reproducing laser (semiconductor laser) 10b is put in a light-emitting state having a light intensity necessary for record mode by the control signal fed from the control unit 12 via the line 27 to the recording/reproducing laser driving circuit 10a of the optical record/reproduce head 10.

The recording/reproducing laser 10b emits a laser light beam whose intensity is modulate by a signal fed from the recording/reproducing laser driving circuit 10a which drives the laser 10b, and the signal used for performing the above-mentioned intensity modulation of the recording/reproducing laser 10b is a signal which is applied from the encoder 15 to the recording/reproducing laser driving circuit 10a as described in the above.

In the encoder 15, a coded recording signal is produced using a signal, which is an objective of recording and is applied thereto from an input terminal 14, the cumulative time value data St in the signal read out from the ROM track Tl and a chapter number inputted from the data input circuit 13, and this recording signal is applied to the recording/reproducing laser 10a of the optical record/reproduce head 10.

During recording operation, when the laser light spots are shifted from the main signal recording/reproducing area 3 to the lead-out signal area 4, in the case that the lead-out signal is read out from the ROM track Tl in the lead-out signal area 4, the lead-out signal is applied from the record circuit 16 to the encoder 15 and the control unit 12 and the operating state of the encoder 15 is controlled by the control unit 12 so that only the lead-out signal is supplied from the encoder 15 to the recording/reproducing laser driving circuit 10a. Subsequently, the shifting mechanism 11 is controlled so that the optical record/reproduce head 10 rapidly returns to the area 2a of the lead-in signal area 2. Then the record circuit 16, the encoder 15, the optical record/reproduce head 10 and so on are controlled so that respective chapter numbers corresponding to all the recording contents recorded in the information recording medium disc D as well as cumulative time value data are recorded on the area 2b of the lead-in signal area 2. After the above-mentioned operation is completed, the optical record/reproduce head 10 is put in stop state with the same being returned to the home position.

When a lead-out signal is applied from the input portion 13 to the control unit 12 to terminate recording operation in connection with the main signal recording-/reproducing area 3 at the middle of the main signal recording/reproducing area 3, the control unit 12 controls various portions of the apparatus so that the record circuit 16, the encoder 15, the optical record/reproduce head 10 and so on perform operations of termination of recording as follows.

When an instruction of termination of recording on the main signal recording/reproducing area 3 is given at the middle of the main signal recording/reproducing area, only cumulative time value data is recorded for a period of several rotations from that instant, and then a lead-out signal is recorded. Subsequently, the optical record/reproduce head 10 is returned rapidly to the area 2a of the lead-in signal area 2, and then a lead-in signal comrising respective chapter numbers corresponding to all the recording contents recorded in the information recording medium disc D as well as cumulative time value data is recorded on the entire area 2b of the lead-in signal area 2. After the above-mentioned operation is completed, the optical record/reproduce head 10 is put in stop state with the same being returned to the home position. At the time of rapidly returning the optical record/reproduce head 10 to the area 2a of the lead-in signal area 2 as described in the above, both the recording/reproducing laser and the erasing laser are put in disabled condition.

In the above-mentioned recording operation, the tracking control circuit 18 and an acuator, to which an output signal from the focus control circuit 19 is fed, control and drive the objective lens 10q so to perform recording operation under satisfactory tracking and focus conditions. This also applies to reproducing operation.

When input information is applied to the input portion 13 for putting the recording/reproducing apparatus in reproduce mode, control signals are generated in the control unit 12 where the control signals are used so that respective portions of the recording/reproducing apparatus perform operations necessary in reproduce mode in sequence, and these control signals are supplied to the respective portions of the recording/reproducing apparatus to cause the same to perform recording/reproducing operations.

As the recording/reproducing apparatus is put in reproduce mode, the shifting mechanism 11 moves the optical record/reproduce head 10 from the home position to a position at which the laser light spots Lbl to Lb3 are positioned within the area 2a of the lead-in signal area 2 of the information recording medium disc D with the control siganl generated in the control unit 12 being fed via the line 30 to the shifting mechanism 11.

Putting the recording/reproducing apparatus in reproduce mode, in a state where the laser light spots Lbl to Lb3 are positioned within the area 2a of the lead-in signal area in the information recording medium disc D with optical record/reproduce head 10 being shifted from its home position, the pilot signal read out from the ROM track Tl in the above-mentioned area 2a of the information recording medium disc D comprises two signals portions, as described in the above, i.e. the signal portion Sa and the continuous signal portion Sc. Since the pilot signal recorded in the ROM track Tl, which track exists in the area 2a of the lead-in signal area 2 of the information recording medium disc D, has a signal form such that its signal portion Sa comprises only the rotation synchronous signal Sr, under a condition where the laser light spots Lbl to Lb3 are positioned within the area 2a of the lead-in signal area 2 of the information recording medium disc D, the rotation synchronous signal Sr is read out from the ROM track Tl by way of the laser light spt Lbl (lead-in signal can be searched quickly if a signal to be recorded in the ROM track Tl in the area 2a of the lead-in signal area 2, is arranged such that the signal portion Sa comprises the rotation synchronous signal Sr and the lead-in signal).

As the recording/reproducing apparatus is put in reproduce mode, the motor driving control circuit 9, to which the control signal is fed from the control unit 12 via the line 31, controls the rotation of the motor 5 so that that motor 5 rotates at a predetermined rotational speed of an initial value. Then the recording/reproducing apparatus is put in a state where the laser light spots Lbl to Lb3 are positioned within the area 2a of the lead-in signal area 2 of the information recording medium disc D to read out the rotation synchronous signal Sr by the laser light spot Lbl, and this rotation synchronous signal Sr is fed from the light-receiving portion 10p to the motor driving control circuit 9 to be compared with a reference signal. As a result, the motor driving control circuit 9 controls the rotational speed of the motor 5 so that the period of the rotation synchronous signal Sr, which is read out the the laser light spot Lbl, is constant all the time, thereby the relative velocity between the laser light spots and the information recording medium disc D assumes a predetermined constant speed all the time.

As the optical record/reproduce head 10 is shifted by the shifting mechanism 11 so that the position of the laser light spots is shifted to the area 2b beyond the boundary between the area 2a and the area 2b of the lead-in signal area 2 of the information recording medium disc D, the pilot signal read out from the ROM track T1 in the area 2b is arranged such that its signal portion Sa comprises the rotation synchronous signal Sr and the negative cumulative time value data St, and the rotation synchronous signal Sr is fed to the motor driving control circuit 9 to be used to control the rotational speed of the motor 5, while the negative cumulative time value data St is used in the control unit 12 for the generation of the control signals.

Furthermore, since a chapter number corresponding to recording contents recorded in the information recording medium disc D, cumulative time value data corresponding to the recording area or the like are recorded in all the RAM tracks T2 in the area 2b of the lead-in signal area 2, when the optical reacord/reproduce head 10 is shifted by the shifting mechanism 11 so that the position of the laser light spots moves in the area 2b of the lead-in signal area 2 of the information recording medium disc D, a lead-in signal including the chapter number corresponding to recording contents of the information recording medium disc D, cumulative time value data corresponding to the recording area or the like is read out from the RAM track T2 in the area 2b, and this read out signal is fed via the reproduce circuit 17 to the control unit 12 to be stored in a memory. The control unit 12 supplies the shifting mechanism 11 with a control signal so that the optical record/reproduce head 10 is rapidly moved to place the laser light spots Lb1 to Lb3 at a top position of a recording portion of information in the main signal recording/reproducing area 3, which information has a chapter number selected for reproduction, using cumulative time value data corresponding to the recording contents of the information recording medium disc D and cumulative time data value indicative of the position of information whose chapter number is selected by reproduction request.

In the case there are plurality of pieces of information which are requested to reproduce, the chapter numbers corresponding to such plurality of pieces of desired information are inputted in advance to successively reproduce them in a sequence.

As reproducing operation is completed, the optical record/reproduce head 10 is returned to the home position to be put in stop or resting state.

Figure 9:
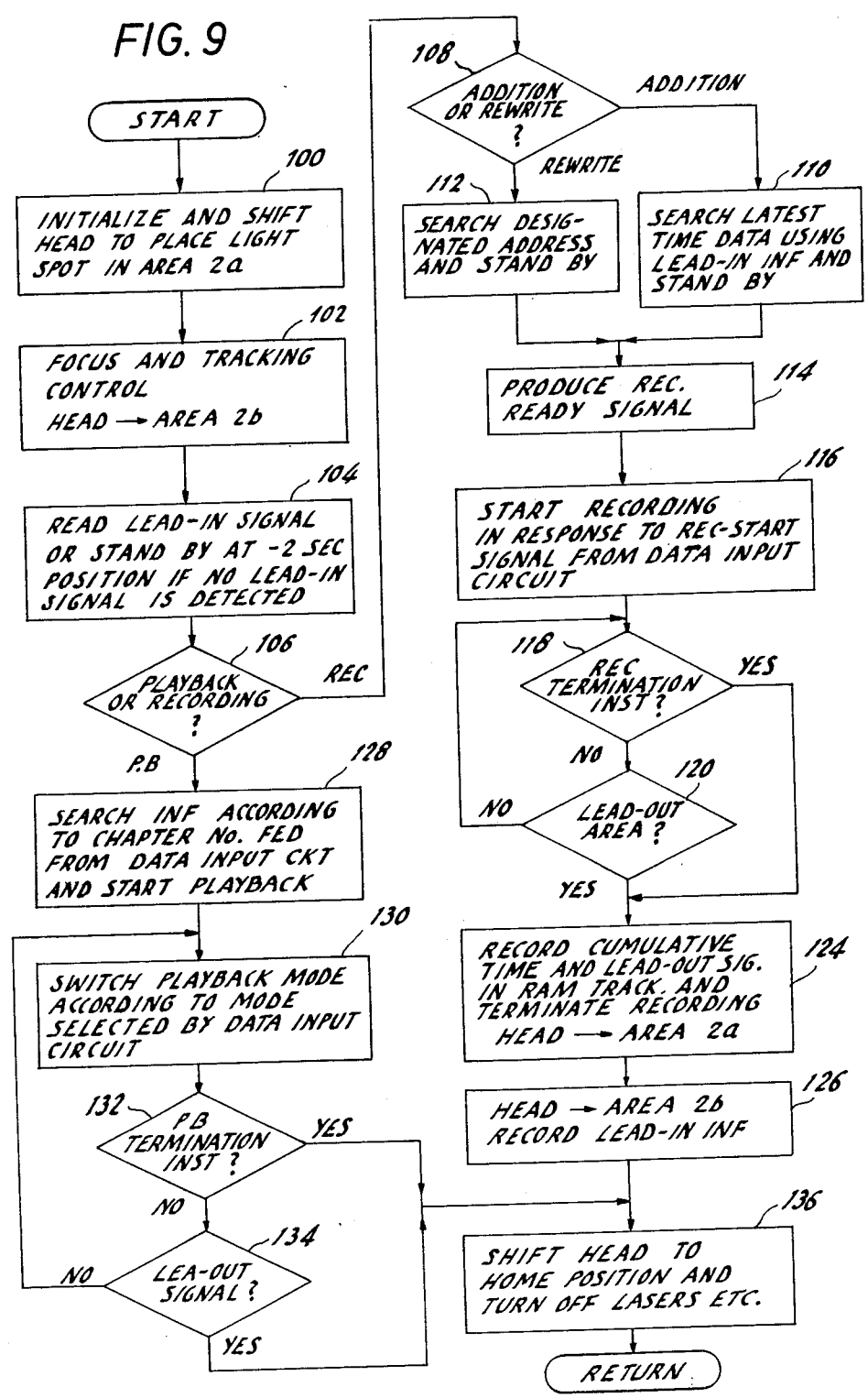
FIG. 9 is a flowchart showing the operatin of a computer used as a control unit included in the apparatus of FIG. 7.

FIG. 9 is a flowchart briefly describing the above-mentioned various operations performed by the recording/reproducing apparatus of FIG. 7. A program of this flowchart is stored in the memory of the microcomputer used as the control unit 12 in advance so that the CPU executes steps included in the routine.

When an unshown power switch is turned on, necessary initialization is effected such that some contents of registers are reset to zero or predetermined values in a step 100. Then the state of the data input circuit 13 is checked to see if any commands or instructions are given. Let us assume either an instruction of recording or reproducing (playback) has been given through the keyboard or switches of the data input circuit 13. The motor drive circuit 9 is enabled to rotate the disc D at a given initial rotational speed. The recording/reproducing laser 10b is turned on and the intensity of the laser beam therefrom is controlled to a low level used for playback. Simultaneously, the encoder 15 is disabled. Then the optical record/reproduce head 10 is shifted by the shifting mechanism 11 so that the laser light spots are located in the area 2a in the lead-in signal area.

In a following step 102, the focus control circuit 19 and the tracking control circuit 18 are enabled to perform necessary focus and tracking control using output signals from the photosensitive elements 10p1 to 10p6 of the light-receiving portion 10. Simultaneously, the motor drive circuit 9 is controlled by rotation synchronous signal from the light receiving portion 10. The optical head 10 is further shifted so that the laser light spots are located in the area 2b. In a following step 104, lead-in signal is read out from the RAM track T2 to store the same in the memory if such lead-in signal has been written therein. On the other hand, if no such lead-in signal is read out, i.e. in the case of a brand new disc, the aforementioned −2 second position is searched to put the optical head 10 in stand by state at such position.

In a step 106, it is checked whether the instruction given from the data input circuit 13 is either playback instrution or recording instruction. In the case of recording instruction, a step 108 is executed. On the other hand, a step 128 is executed in the case of playback instruction. Suppose recording instruction has been given, it is determined whether additional recording or rewriting is desired by checking the sort of recording instruction manually set in the data input circuit 13. This "additional recording" means recording of information or data at a location following the latest information, whereas "rewriting" means recording of information with old information being erased. In the case of ADDITION, a step 110 is executed to search the latest time data using lead-in information so as to access the location following the latest information. In the case of REWRITE, a designated address is searched to access an associated location. In either of the steps 110 and 112, the optical head 10 is put in stand by state to start recording when recording insruction is given.

In a step 114 following the steps 110 and 112, a REC-READY signal is produced which is used to indicate that it is ready for recording with the optical head 10 being put in stand by state. In detail, an indicator made of an LED or the like provided to the data input circuit 13 may be turned on to advise the user of such a state. It is assumed that the data input circuit 13 comprises a REC-START button or switch (not shown) so that recording is started at any desired instant. When the REC-START button is depressed, a step 116 is executed to start recording or writing input information or data on the RAM track T2. In detail, the encoder 15 is enabled, while the erasing laser 10j is turned on. Furthermore, the recording/reproducing laser 10b is controlled to increase the light intensity to a higher level for recording. In addition, a chapter number assigned to a piece of information to be recorded, which chapter number is inputted via the ten-key of the data input circuit 13, is stored in the memory.

With these operations, recording is started, and in a step 118, it is checked whether a REC TERMINATION instruction is given from the data input circuit 13. If no such instruction is given, a next step 120 is executed to check when the lead-out signal is detected from the ROM track T1. These two steps 118 and 120 are repeatedly executed to continue recording until REC TERMINATION instruction is given or lead-out signal is detected. When one of these two states is satisfied, a step 124 is executed to record cumulative time data in the RAM track T2 immediately after recorded information over several revolutions of the disc D. After this, a lead-out signal is recorded in the RAM track T2 to indicate the latest recording position. Furthermore, the latest time and chapter No. are stored in the memory. Then the recording/reproducing laser 10b is controlled so that light intensity assumes the lower level, and the erasing laser 10j as well as the encoder 15 is disabled. After this, the optical head 10 is shifted so that the light spots are rapidly returned to the area 2a.

In a following step 126, the optical head 10 is further moved to place the light spots in the area 2b of the lead-in signal area 2 to record lead-in information, i.e. the chapter number associated with the just recorded piece of information and cumulative time data thereof, by reading these data from the memory. In detail, the erasing laser 10j is turned on while the recording/reproducing laser 10b is controlled to exhibit higher light intensity for recording with the encoder 15 being enabled.

After the step 126, a step 136 is executed to finally terminate any recording by turning off or disabling all the lasers 10b and 10j, the encoder 15, the tracking control circuit 18, the focus control circuit 19, the motor drive circuit 9 and so on. Simultaneously, the optical head 10 is shifted to be rested at its home position.

Turning back to the step 106, let us assume that an instruction for playback is given through the data input circuit 13. Then the step 128 is executed to search a desired piece of information using a designated chapter number given through the data input circuit 13. When a desired piece of information is found, then playback is started. If no chapter number is inputted, then playback is started from the beginning of the main signal recording/reproducing area 3. A next step 130 is provided for determining a playback mode, such as normal playback, still playback, slow-motion playback and so on, selected by the data input circuit 13. Steps 132 and 124 are similar to the steps 118 and 120 so that playback is continued until PLAYBACK TERMINATION instruction is given or a lead-out signal is read out from the RAM track T2. After one of these steps, the step 136 is executed to terminate reproducing operation.

As described in the above according to the present invention, since rotation synchronous signal is recorded in a recording track in advance at the time of fabrication of a disc in unerasable manner, recording/reproducing operation with high recording density can be effected according to CLV system satisfactorily using the rotation synchronous signal which is read out during recording and/or reproducing. In addition, it is possible that recording time and linear velocity are not affected by a used recording/reproducing apparatus, while interchangeability with so called compact disc is obtained in connection with signal by providing lead-in signal area and lead-out signal area. Furthermore, it is possible to write lead-out information at an end of recording information only, while misaccessing satisfactorily prvented. Moreover, since data of both positive and negative cumulative time values with respect to reference position are used, recording time can accurately indicated by time information inherent to each position on the disc D. With thsee arrangement, quick access is made possible. Furthermore, since the recording track of the main signal is different from the recording track of the tracking pilot signal, there is an advantage that S/N of the main signal is improved.

The above-described embodiments are just examples of the present invention, and therefore, it will be apparent for those skilled in the art that many modifications and variations may be made without departing from the scope of the present invention.

What is claimed is:

1. A method of recording information on an information recording disc having a recording layer in which information can be recorded repeatedly with pre-recorded information being erased, said recording layer having a spiral guide track formed in the form of geometrical variations so as to carry at least a synchronous signal and cumulative time data indicative of the lapse of time during either recording or reproducing from a predetermined point on said recording layer, said spiral guide track functioning as a ROM track being formed such that a portion between adjacent spiral guide tracks is a flat land area which is used as a spiral RAM track for recording and/or reproducing information, said recording layer having a lead-in signal area, a main signal recording area, and a lead-out signal area, said cumulative time data being included in said ROM track in said lead-in signal area and said main signal recording area, said lead-out signal area including a lead-out signal indicating an end of said recording layer, said main signal recording area being interposed between said lead-in signal area and said lead-out signal area, said method comprising the steps of:

(a) reading said synchronous signal from said ROM track in said lead-in signal area by applying a light spot so as to control rotational speed of said disc thereby establishing constant linear velocity;

(b) determining whether chapter number and cumulative time data are prerecorded in said lead-in signal area of said RAM track;

(c) reading a chapter number and cumulative time data from said RAM track in said lead-in signal region when it is determined that such chapter number and time data are prerecorded therein;

(d) shifting a record head so that a light beam therefrom is located at a place indicated by said chapter number and cumulative time data when such number and data are read out, or at a predetermined place when said chapter number and time data are not read out;

(e) recording main information by said record head on said RAM track in said main signal recording area together with a chapter number assigned to a piece of information to be recorded and with cumulative time data read out from said ROM track adjacent to said RAM track; and (f) recording only lead-out signal in said RAM track in said lead-out signal area when said lead-out signal is read out from said ROM track adjacent to said RAM track.

2. A method of recording information on an information recording disc having a recording layer in which information can be recorded repeatedly with pre-recorded information being erased, said recording layer having a spiral guide track formed in the form of geometrical variations so as to carry at least a synchronous signal and cumulative time data indicative of the lapse of time during either recording or reproducing from a predetermined point on said recording layer, said spiral guide track functioning as a ROM track being formed such that a portion between adjacent spiral guide tracks is a flat land area which is used as a spiral RAM track for recording and/or reproducing information, said recording layer having a lead-in signal area, a main signal recording area, and a lead-out signal area, said cumulative time data being included in said ROM track in said lead-in signal area and said main signal recording area, said lead-out signal area including a lead-out signal indicating an end of said recording layer, said main signal recording area being interposed between said lead-in signal area and said lead-out signal area, said method comprising the steps of:

(a) reading said synchronous signal from said ROM track in said lead-in signal area by applying a light spot so as to control rotational speed of said disc thereby establishing constant linear velocity;

(b) determining whether chapter number and cumulative time data are prerecorded in said lead-in signal area of said RAM track;

(c) reading a chapter number and cumulative time data from said RAM track in said lead-in signal region when it is determined that such chapter number and time data are prerecorded therein;

(d) shifting a record head so that a light beam therefrom is located at a place indicated by said chapter number and cumulative time data when such number and data are read out, or at a predetermined place when such chapter number and time data are not read out;

(e) recording main information by said record head on said RAM track in said main signal recording area together with a chapter number assigned to a piece of information to be recorded and with cumulative time data read out from said ROM track adjacent to said RAM track;

(f) sensing interruption of recording of said main signal;

(g) recording cumulative time data read out from said ROM track adjacent to said RAM track, on said RAM track over several revolutions of said disc when interruption of recording of said main signal is sensed;

(h) recording lead-out signal in said RAM track at a portion subsequent to said cumulative time data;

(i) shifting said record head so that a light beam therefrom is directed to said lead-in signal area; and (j) recording lead-in information, in said RAM track in said lead-in signal area, corresponding to said chapter number and said cumulative time data of said piece of information just recorded in said RAM track in said main signal recording area.

3. A method of recording information as claimed in claim 2, further comprising the steps of:

(a) putting said record head in stand by state, when a further piece of main information is to be recorded, so that light beam therefrom is located at a portion where said cumulative time data is pre-recorded on said RAM track over several revolutions of said disc; and (b) recording said further piece of main information by said record head on said RAM track in said main signal recording area together with a chapter number assigned to a piece of information to be recorded and with cumulative time data read out from said ROM track adjacent to said RAM track so that said further piece of main information is recorded at a place following a newest piece of main information recorded while said cumulative time data of recorded together with said further piece of main information represents time which continues from time represented by cumulative time data recorded together with the newest piece of main information.

4. A method of recording information as claimed in claim 3, further comprising the steps of:

(a) recording cumulative time data read out from said ROM track adjacent to said RAM track, on said RAM track over several revolutions of said disc when recording of said main signal is interrupted;

(b) recording lead-out signal in said RAM track at a portion subsequent to said cumulative time data;

(c) shifting said record head so that a light beam therefrom is directed to said lead-in signal area; and (d) recording lead-in information, in said RAM track in said lead-in signal area, corresponding to said chapter number and said cumulative time data of said piece of information just recorded in said RAM track in said main signal recording area.

5. A method of recording information as claimed in claim 2, further comprising a step of:

performing tracking control operation for said recording method by tracing two of said ROM tracks at both sides of said RAM track on which said main information is to be recorded or pre-recorded main information is to be reproduced therefrom, said tracking control operation being performed by using two laser light spots while recording and/or reproducing said main information on and from said RAM track being performed using one laser light spot arranged at the middle of said two laser light spots, said three laser light spots being arranged in line in a direction having a given angle with respect to said RAM track so that one of said two laser light spots, which spot precedes said laser light spot used for recording and/or reproducing said main information relative to disc movement, is used for reading out said synchronous signal and said cumulative time data and so that preceding light spot is positioned closer to an area in which the information signal is to be recorded than the other of said two laser light spots.

6. A method of recording information as claimed in claim 5, further comprising a step of:

(a) reproducing pre-recorded main information from said main track; and (b) reducing the intensity of three laser light beams producing said three laser light spots when said reproducing said pre-recorded main information so that the intensity is lower than that used for recording main information.

7. A method of recording information as claimed in claim 2, further comprising the step of:

recording only lead-out signal in said RAM track in said lead-out signal area when said lead-out signal is read out from said ROM track adjacent to said RAM track.

8. Apparatus for recording and/or reproducing information on an information recording disc having a recording layer in which information can be recorded repeatedly with pre-recorded information being erased, said recording layer having a spiral guide track formed in the form of geometrical variation so as to carry at least a synchronous signal and cumulative time data indicative of the lapse of time during either recording or reproducing from a predetermined point on said recording layer, said spiral guide track functioning as a ROM track being formed such tat a portion between adjacent spiral guide tracks is a flat land area which is used as a spiral RAM track for recording and/or reproducing information, said recording layer having a lead-in signal area, a main signal recording area, and a lead-out signal area, said cumulative time data being included in said ROM track in said lead-in signal area and said main signal recording area, said lead-out signal area including a lead-out signal indicating an end of said recording layer, said main signal recording area being interposed between said lead-in signal area and said lead-out signal area, said apparatus comprising:

(a) disc drive means for rotating said information recording disc at a constant linear velocity using a synchronous signal;

(b) record and/or reproduce head means for applying laser light beams to said disc so that three laser light spots are directed to said recording layer of said disc for writing and reading main information on and from said RAM track using one of said three laser light spots and for reading, during writing and reading of said main information, information from two adjacent ROM tracks on both sides of said RAM track used for writing or reading using remaining two laser light spots, said three laser light spots being arranged in line in a direction having a given angle with respect to said RAM track so that one of said two laser light spots, which spot precedes said laser light spot used for recording and/or reproducing said main information relative to disc movement, is used for reading out said synchronous signal and said cumulative time data, said record and/or reproduce head having a plurality of photosensitive elements responsive to light rays reflected at said recording layer of said disc at said three laser light spots, at least two of said photosensitive elements which are responsive to reflected light rays from said remaining two laser light spots producing tracking signals by reading the same from said two ROM tracks, while one of said two photosensitive elements producing synchronous signal and cumulative data by reading the same from one of said two said ROM tracks;

(c) shifting means for shifting said record and/or reproduce head to place said three laser light spots at desired positions;

(d) tracking control circuit responsive to said tracking signals from said record and/or reproduce head means for performing tracking control;

(e) record and/or reproduce circuit means for processing a recording signal to be applied to said record and/or reproduce head and a reproduced signal from said record and/or reproduce head;

(f) control means for controlling said motor drive means, said record/and/or reproduce head, said shifting means, said tracking control circuit, said record and/or reproduce circuit means so as to record and/or reproduce information on and from said disc at desired positions, said control means having a memory for storing chapter number and cumulative time data both read out from said ROM track in said lead-in signal area for controlling said shifting means when such number and data are pre-recorded; and (g) means within said control means for reading said cumulative time data from said ROM track adjacent to said RAM track and for recording said cumulative time data on said RAM track.

9. Apparatus for recording and/or reproducing information as claimed in claim 8, further comprising a focus control means reponsive to an output signal from at least one of said photosensitive elements of said record/reproduce head.

10. Apparatus for recording and/or reproducing information as claimed in claim 8, further comprising a data input means for manually inputting data including a chapter number to be assigned to a piece of information to be recorded a chapter number for designating a pre-recorded piece of information.

* * * * *